Jan. 19, 1954 R. A. EDWARDS 2,666,575

CALCULATING DEVICE

Filed Oct. 26, 1949 2 Sheets-Sheet 1

Inventor:
Robert A. Edwards,
by Claude H. Mott
His Attorney.

Inventor:
Robert A. Edwards,
by [signature]
His Attorney.

Patented Jan. 19, 1954 2,666,575

UNITED STATES PATENT OFFICE 2,666,575

CALCULATING DEVICE

Robert A. Edwards, Schenectady, N. Y., assignor to General Electric Company, a corporation of New York Application October 26, 1949, Serial No. 123,700

9 Claims. (Cl. 235—61)

This invention relates to calculating devices and has for its object a simple and reliable electronic shifting register for shifting a binary number stored therein in controlled digit displacement to the right or left of its original storage position as desired.

The shifting register device is intended for use in conjunction with a shifting adder component to form with the latter the arithmetic element of a binary digital computer. The function of the shifting register of this invention is to multiply or divide a binary number by 2 any required number of times by successively shifting the number in one digit displacement left or right respectively for each multiplication or division. For example, assuming the binary number 1010 whose decimal equivalent is 10, such binary number may be divided by 2 by shifting the digits one place to the right thereby forming the binary number 0101.0 whose equivalent in the decimal system is 5. Conversely by shifting the digits of binary number 1010 one digit to the left the binary number 10100 is formed whose decimal equivalent is 20. By successively shifting the digits of a binary number to the right or left a complete series of division or multiplication of the number by 2 results.

In general, my invention comprises a first and a second plurality of flip-flop circuits, means storing any particular binary number in the first plurality of circuits, means transferring the number to the second plurality of circuits in corresponding digital relation, means shifting the binary number back to the first plurality of circuits in a desired digit displacement and means controlling the direction of such displacement.

Figure 1A:
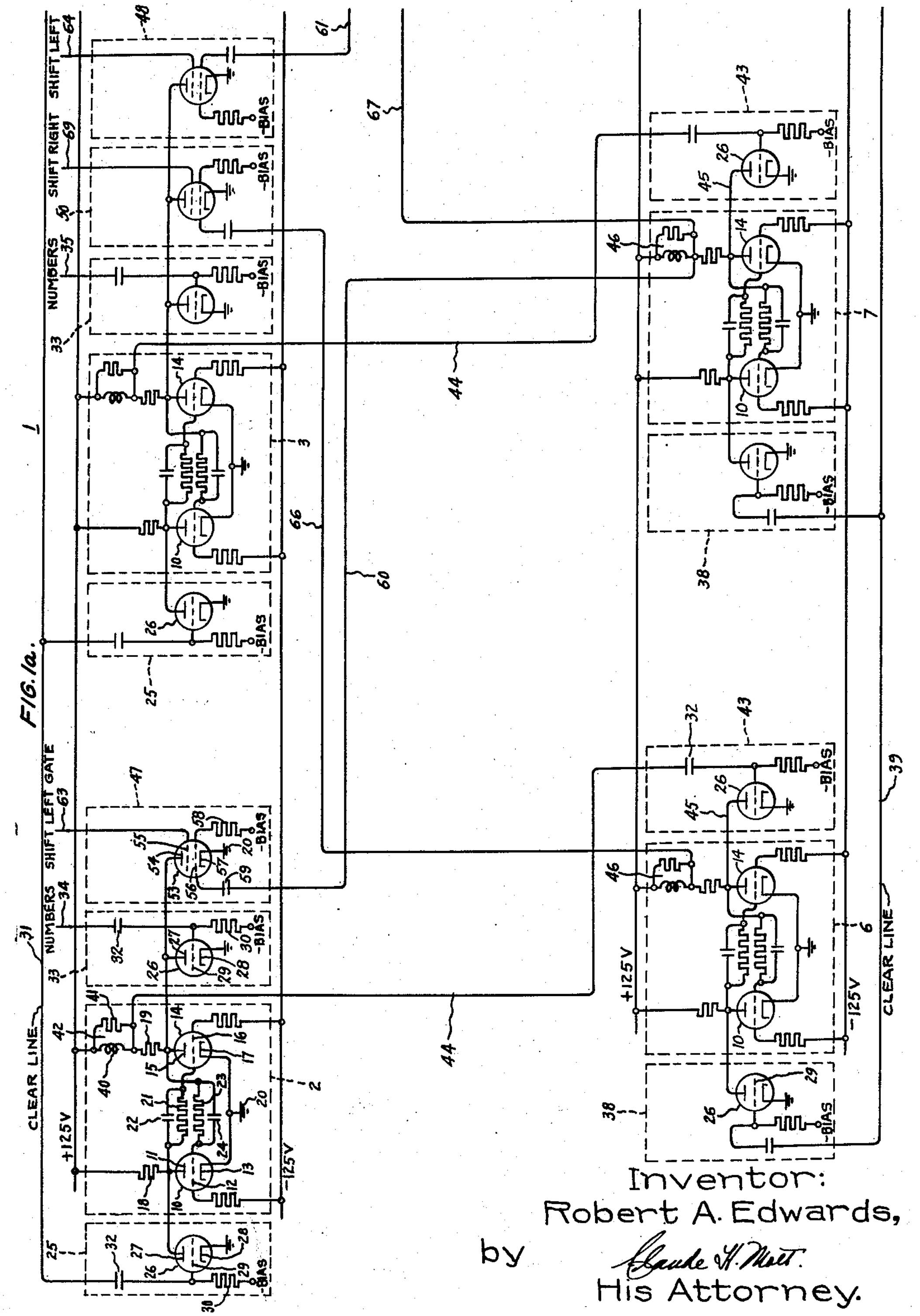
Figure 1B:
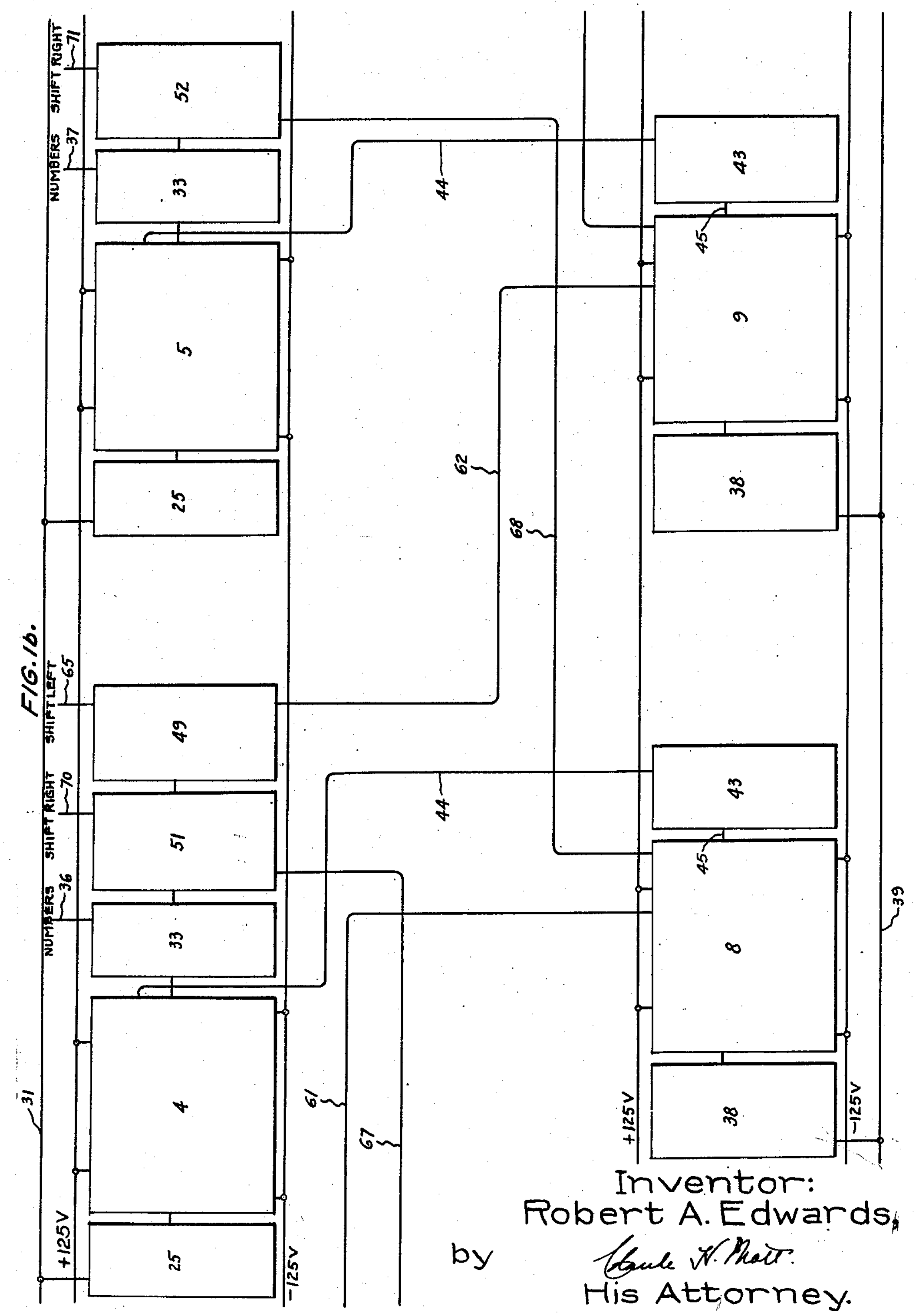

For a complete understanding of my invention, reference should be had to the following specification and the accompanying drawings in which similar members are given the same character references throughout the drawings. In the drawings Figures 1*a* and 1*b* combined are a diagrammatical view of an electrical circuit of a shifting register illustrative of my invention.

Referring to the drawing, in accordance with my invention I provide a high speed electronic shifting register 1 comprising a first plurality of flip-flop circuits 2—5 and a second plurality of flip-flop circuits 6—9. Each of the flip-flop circuits 2—9 are identical and comprise a clear receiver grid-biased electronic tube 10 having an anode 11, a control grid 12, and cathode 13 and a numbers receiver grid-biased electronic tube 14 having an anode 15, a control grid 16, and a cathode 17. The anodes 11 and 15 are electrically connected respectively through anode plate resistors 18 and 19 to the positive side of a source of potential, which I have represented as +125 volts, the negative side of this source being connected to ground and the cathodes 13 and 17 being connected to the negative side of this source by a ground connection 20.

To provide alternate operation of the tubes 10 and 14, one on and the other off, to represent thereby in each of the flip-flop circuits 2—9 the character of a particular binary digit, I provide resistor and capacitor means electrically connecting the anode of one tube to the control grid of the other; that is, I provide a resistor 21 and a capacitor 22 electrically connected in parallel between anode 11 and grid 16 and a resistor 23 and capacitor 24 electrically connected in parallel between the anode 15 and the control grid 12. With this arrangement, assuming the condition of tube 10 conducting and tube 14 off to represent in each flip-flop circuit the storage of the binary character 0 therein and the reverse relationship of tube 14 conducting and tube 10 off to represent the binary character 1 stored in each flip-flop circuit, then, if in flip-flop circuit 2, for example, tube 14 were conducting and tube 10 off, indicating the storage of the binary character 1 in flip-flop circuit 2, and it were desired to store the character 0 in place of 1 therein, such change may be accomplished by lowering the voltage of anode 11; that is, by lowering the voltage of anode 11 the voltage of grid 16 which is electrically connected thereto is lowered. The lowering of the voltage on grid 16 interrupts the conductivity of numbers tube 14 and thereby raises the anode voltage thereof, that is, of anode 15. By thus raising the voltage of anode 15 the voltage of grid 12 of tube 10 is raised and tube 10 becomes conductive. Thus, by lowering the anode voltage of tube 10 the conductivity of tube 14 is interrupted and tube 10 becomes conductive thereby representing in flip-flop circuit 2 the storage of the binary character 0 in place of the binary character 1. In a similar manner, if tube 10 is conducting and tube 14 nonconducting, thereby representing the storage of the binary character 0 in a particular one of the flip-flop circuits, to store a 1 in place of the 0 the anode voltage of the numbers tube 14 may be lowered.

If the clear tube 10 were conducting and numbers tube 14 off, thereby representing the storage of a 0 in the flip-flop circuit, and the anode voltage of tube 10 were lowered, thereby calling for the same binary character, no change in conductive conditions of the tubes 10 and 14 would result because tube 10, being already conducting, would not be affected by a limited lowering of its anode voltage, and tube 14 being in a non-conductive condition, a further lowering of its grid voltage would merely present an added impediment to a condition of conduction therein. The same is true if a 1 were stored in a flip-flop circuit and a call were received for the storage of a 1 by lowering the anode voltage of the numbers tube associated therewith. Thus, by lowering the anode voltage of a clear receiver electronic tube of a flip-flop circuit, such voltage variation will have no effect if a zero is already stored therein but will change a 1 stored therein to a zero, and a lowering of the anode voltage of a numbers receiver electronic tube of a flip-flop circuit will change the stored number from 0 to 1 if a zero is stored in the circuit and otherwise will leave the circuit in the same condition indicating that a 1 is already stored therein.

Applying the principles described above to the first plurality of flip-flop circuits 2—5 it is possible then to store any binary number of four digit length in the flip-flop circuits 2—5 by first clearing all of the circuits, that is, by lowering the anode voltage of each of the clear receiver tubes to store a zero in each of the flip-flop circuits. Thereafter, lowering the voltage on the anodes of selected numbers receiver tubes stores the binary character 1 in the flip-flop circuits associated therewith.

Any suitable means may be used for lowering the anode voltages on the anodes of the clear receiver tubes as, for example, by providing a first plurality of clear actuating electronic circuits 25 each comprising a grid-biased electronic tube 26 having an anode 27 electrically connected to the anode 11 of the clear receiver tube 10 of an associated flip-flop circuit, a cathode 28 electrically connected to a lower voltage with respect to the anode voltage as, for example, the ground 20, a control grid 29 electrically connected to a source of negative voltage bias through a resistor 30, as shown in the drawing, and to a clear line 31 common to all of said clear actuating circuits 25 through a capacitor 32. Clear line 31 is connected to a suitable source of positive voltage impulse (not shown). In this arrangement, by applying a positive voltage impulse to the clear line 31 a positive voltage is applied to the grid 29 of each of the clear actuating tubes 26 thereby producing conduction therein and lowering the anode voltage of each clear receiver tube 10 of the flip-flop circuits 2—5 to store the binary character 0 in each of the circuit 2—5.

To actuate particular ones of the numbers receiver tubes and thereby store the binary character 1 in particular ones of the flip-flop circuits 2—5 to represent therein a particular binary number, any plurality of suitable means, each separately operable to lower the anode voltage of a particular one of the numbers receiver tubes 14, may be employed. For example, a plurality of numbers actuating electronic circuits 33 may be used, each circuit being identical in structure and operation to the clear actuating circuits 25 and electrically connected each to the anode 15 of the numbers receiving tube 14 of a particular one of the flip-flop circuits 2—5, as shown in the drawing. To actuate the numbers actuating circuits 33, the grids 29 of the tubes 26 therein are electrically connected respectively to a plurality of numbers input lines 34—37, each of which is electrically connected to a separate source (not shown) of positive voltage impulse. Thus, to place a binary number, say 1010, in the first plurality of flip-flop circuits 2—5, clear line 31 is first pulsed to store the binary character 0 in each of the flip-flop circuits 2—5 through the medium of the clear actuating circuits 25 and thereafter numbers lines 34 and 36 are pulsed to place the binary characters 1 in the flip-flop circuits 2 and 4.

To shift the binary number 1010 one digit to the right or one digit to the left in the circuits 2—5 according to the desired operation of division or multiplication of the number by 2, the number is first transferred to the second plurality of flip-flop circuits 6—9 in corresponding digital order and then shifted back to the circuits 2—5 in one digit displaced right or left as required.

To accomplish the transfer of the binary number stored in circuits 2—5 to the circuits 6—9 in corresponding digital order, any suitable means is provided for varying the voltage on the anodes 11 of the clear receiver tubes 10 of the second plurality of flip-flop circuits 6—9 to clear all of these circuits. For the purpose of illustrating my invention, I have shown for such means a second plurality of clear actuating electronic circuits 38 each identical in operation and structure to the clear actuating circuits 25 previously described. Each of the electronic circuits 38 is electrically connected to the anode of a particular one of the clear receiver tubes 10 of the flip-flop circuits 6—9 and to a second clear line 39, as shown in the drawing. Clear line 39 is electrically connected to a source (not shown) of positive voltage impulse. By pulsing clear line 39 the binary character 0 is stored in each of the flip-flop circuits 6—9 through the medium of the circuits 38 in the same manner that flip-flop circuits 2—5 are cleared by clear line 31 and clear actuating circuits 25; that is, by pulsing clear line 39 a positive voltage is impressed on the grids 29 of the tubes 26 of the clear actuating circuits 38 causing tubes 26 to become conductive and thereby lower the anode voltage of tubes 10 in the flip-flop circuits 6—9.

As a second element necessary for the transfer of a binary number from the flip-flop circuits 2—5 to the flip-flop circuits 6—9 in corresponding digital order, I provide a plurality of positive voltage impulse producing members each responsive in operation to the interruption of conductivity of a particular one of said numbers receiver tubes. For example, such a circuit may comprise an induction coil 40 and a resistor 41 electrically connected in parallel between the anode plate resistor 19 and the positive voltage source indicated to form a choke circuit 42. In this arrangement, when the conductivity of tube 14 is interrupted a voltage is developed by the coil 40 which produces a positive voltage impulse in the circuit 42. Conversely, when tube 14 is operated from a nonconductive to conductive condition a voltage is developed in coil 40 producing a negative voltage impulse in circuit 42.

To utilize the positive voltage impulses of the circuits 42 to operate the numbers receiver tubes 14 of the flip-flop circuits 6—9 in response to an interruption of conductivity of tubes 14 of circuits 2—5, a plurality of transfer electronic circuits 43, each identical in structure and operation to the clear actuating circuits 25 previously described, is provided. Each of the transfer electronic circuits 43 is electrically connected to the choke circuit 42 of a particular one of the flip-flop circuits 2—5 by conductors 44, to the anode 15 of the numbers receiving tube 14 of an associated flip-flop circuit of the second plurality of flip-flop circuits 6—9 by conductors 45, and to a source of negative voltage bias indicated, as shown in the drawing. Thus, when a positive voltage impulse is produced by the choke circuit 42 associated with a particular one of the flip-flop circuits 2—5, such impulse is transmitted through the conductor 44 associated with that flip-flop circuit to a particular one of the transfer circuits 43 to cause the tube 26 of that transfer circuit to become conductive and thereby lower the anode voltage of the numbers receiving tube 14 of a particular one of the second plurality of flip-flop circuits 6—9 associated with the particular one of the first plurality of flip-flop circuits 2—5. For example, an interruption of conductivity in tube 14 of flip-flop circuit 2 causes a positive voltage impulse to be transmitted from choke circuit 42 through conductor 44 to the transfer circuit 43 associated with flip-flop circuit 6, thereby reducing the anode voltage of tube 14 of flip-flop circuit 6 and storing the binary character 1 in flip-flop circuit 6. Thus a particular binary number stored in flip-flop circuits 2—5 is transferred to flip-flop circuits 6—9 in corresponding digital order.

To shift the particular binary number back to flip-flop circuits 2—5 in one digit displacement and to control the direction of such displacement, a second plurality of choke circuits 46 or other suitable impulse producing means are electrically connected one in each of the flip-flop circuits 6—9, as shown in the drawing, to produce a positive voltage impulse each in response to an interruption of conductivity of the numbers tube 14 of the flip-flop circuit associated therewith. Also a plurality of shift left gate electronic circuits 47—49 and a plurality of shift right gate electronic circuits 50—52 are provided.

All of the shift left and shift right gate circuits 47—52 are identical and comprise a multigrid electronic tube 53 having an anode 54, a first control grid 55, a second control grid 56, and a cathode 57. The cathodes 57 are electrically connected to the ground 20, and the anodes 54 are electrically connected to the anodes 27 of the tubes 26 of the numbers electronic circuits 33. The second control grids 56 are connected to a negative voltage bias indicated each through a particular one of a plurality of resistors 58, and each of the second control grids 56 is electrically connected to an associated one of a plurality of coupling capacitors 59. The second control grids 56 of the shift left gate circuits 47—49 are electrically connected respectively to the choke circuits 46 of the respective flip-flop circuits 7—9 through respective conductors 60—62, as shown in the drawing. The first control grids 55 of the shift left gate circuits 47—49 are electrically connected each to a selective source of positive and negative voltage impulses (not shown) through respective conductors 63—65. The second control grids 56 of the shift right gate circuits 50—52 are electrically connected respectively to the choke circuits 46 of the respective flip-flop circuits 6—8 through respective conductors 66—68, as shown in the drawing.

The first control grids 55 of the shift right gate circuits 50—52 are electrically connected each to a selected source of positive and negative voltage impulses (not shown) through respective conductors 69—71. The tubes 53 of the shift left and shift right gate circuits 47—52 are arranged to operate to conductive condition only when both the control grids 55 and 56 are simultaneously impressed with a positive voltage impulse, and when in conductive condition each lowers the anode voltage of the numbers receiver tube 14 of the particular one of the first plurality of flip-flop circuits 2—5 to which the shift left or shift right gate circuit is connected, thus storing the binary character 1 in that particular flip-flop circuit.

By means of the multigrid control of tubes 53 of the shift left and shift right gate circuits 47—52 it is possible to control the direction of displacement of a binary number as it is shifted from the flip-flop circuits 6—9 to circuits 2—5. For example, assuming that a particular binary number is stored in the flip-flop circuits 6—9 and that the character of the particular binary digit represented by the flip-flop circuit 7 is the binary character 1, to transfer the binary character 1 from flip-flop circuit 7 to flip-flop circuit 2, that is, in one digit displacement to the left of its original stored position in the first plurality of flip-flop circuits 2—5, the first control grid 55 of the electronic tube 53 of the shift right gate circuit 51 is impressed with a negative voltage through the conductor 70 to prevent the transfer of the binary character 1 from flip-flop circuit 7 to flip-flop circuit 4. Moreover, the first control grid of the electronic tube 53 of the shift left gate circuit 47 is impressed with a positive voltage through the conductor 63 to condition the tube 53 for operation in response to the application of a positive voltage impulse to the second control grid 56 thereof.

To apply such positive voltage to the second control grid 56 of the electronic tube 53 of the shift left gate circuit 47, the clear line 39 is pulsed with a positive voltage to interrupt the conductivity of the numbers tube 14 of the flip-flop circuit 7, thereby producing a positive voltage impulse from the choke circuit 46 thereof, which positive voltage is impressed upon the second control grid 56 of the shift left gate circuit 47 through the conductor 60 and the capacitor 59. Thus both the first and second control grids 55 and 56 of the shift left gate circuit 47 are impressed with a positive voltage to operate the electronic tube 53 thereof to conductive condition and thereby lower the anode voltage of the numbers tube 14 of flip-flop circuit 2 to store the binary character 1 in flip-flop circuit 2. Therefore, by selective control of the voltage applied to the first control grids of the shift left gate tube of circuit 47 and the shift right gate tube of circuit 51, the binary character 1 stored in flip-flop circuit 7 is transferred to flip-flop circuit 2. As a further use of the control means provided by the first control grids 55 of the shift left and shift right gate tubes, such first control grids 55 may be impressed with a negative voltage to prevent the transfer of a binary character 1 from any of the second plurality of flip-flop circuits 6—9 to the first plurality of flip-flop circuits 2—5. This is desirable at the time that the flip-flop circuits 6—9 are being cleared for receipt of a binary number from the first plurality of flip-flop circuits 2—5 since it is desirable in such clearing of the second plurality of flip-flop circuits 6—9 to also maintain the first plurality of flip-flop circuits 2—5 in the cleared condition to which they have been operated as described below.

To show a complete operation of my shifting register as above described, assume it is desirable to divide the binary number 1010 by 2. Such an operation is performed by first pulsing the clear line 31. In this operation the anode voltage of clear receiver tubes 10 of the flip-flop circuits 2—5 is lowered through the medium of the clear actuating circuits 25 and all of the tubes 10 remain or are placed in conductive condition. Those of numbers tubes 14 of the flip-flop circuits 2—5 which were conducting are interrupted. The interruption of such tubes 14 provides, through the medium of their associated choke circuits 42, a positive voltage impulse from each choke circuit which impulses operate each on a particular one of the transfer tubes of circuits 43 to operate the numbers receiver tube 14 associated therewith and store the binary character 1 in certain of the flip-flop circuits 6—9. Flip-flop circuits 2—5 are now clear but flip-flop circuits 6—9 may or may not have the binary character 1 stored in particular circuits thereof. The storage at this time of the character 1 in any of the flip-flop circuits 6—9 is undesirable as it is necessary to have the circuits 6—9 clear for a proper transfer of a particular number from circuits 2—5 to 6—9; that is, if a 1 were stored in circuit 7, for example, and it were desired to transfer the number 1010 from circuits 2—5 to 6—9, the result of such attempted transfer would result in the binary number 1110 in the circuits 6—9 instead of the proper binary number 1010. Therefore, having cleared the circuits 2—5, to clear circuits 6—9 of any binary characters 1 inadvertently transferred thereto by clearing circuits 2—5, circuits 6—9 are thereafter cleared by pulsing the clear line 39. In performing this operation clear line 39 is pulsed with a positive voltage to lower the voltage on the anodes of the clear receiver tubes 10 of the second plurality of flip-flop circuits 6—9 through the medium of the second plurality of clear actuating circuits 38, as previously described.

However, it should be noted that if either the shift left or shift right gate circuits are in a position to operate by having a positive voltage impressed on the first control grids 55 of the tubes 53 thereof, then if the binary character 1 is stored in any of the circuits 6—9 such number will be shifted back to the first plurality of circuits 2—5 when the clear line 39 is pulsed. This is undesirable because the circuits 2—5 must be clear to insert therein a particular binary number upon which it is desired to operate. Therefore, to maintain a clear condition of circuits 2—5 while clear line 39 is being pulsed, a negative bias is applied to the control grids 55 of the tubes 53 of both the shift left and shift right gate circuits to make such tubes nonconducting.

After clearing both pluralities of flip-flop circuits 2—5 and 6—9, certain of the numbers input lines 34—37 are pulsed to store a particular binary number in circuits 2—5. For example, to store the binary number 1010 therein numbers inputs 34 and 36 are pulsed thereby operating numbers receiver tubes 14 of flip-flop circuits 2 and 4 through the medium of the numbers actuating circuits 33 associated therewith to store the binary character 1 in each of circuits 2 and 4. To transfer the binary number 1010 from circuits 2—5 to circuits 6—9 in corresponding digital relation clear line 31 is pulsed to produce a positive voltage pulse on grids 29 of tubes 26 of the clear actuating circuits 25 causing tubes 26 to become conductive and thereby interrupt the conductivity of tubes 14 of the flip-flop circuits 2 and 4. The interruption of conductivity in tubes 14 of the flip-flop circuits 2 and 4 produces a positive voltage impulse from the choke circuits 42 associated therewith and the impulses thus produced act upon the transfer circuits 43 associated with flip-flop circuits 6 and 8 to produce conductivity in the numbers receiver tubes 14 of the circuits 6 and 8. Thus the binary characters 1 are transferred from circuits 2 and 4 to circuits 6 and 8 and the binary number now stored in flip-flop circuits 6—9 is 1010. The flip-flop circuits 2—5 are now clear.

To shift the number 1010 from flip-flop circuits 6—9 back to circuits 2—5 in one digit displacement to the right, that is, to divide the binary number 1010 by 2, the tubes 53 of the shift left gate circuits 47—49 are made inoperative by applying a negative voltage to the first control grids 55 thereof through conductors 63—65, and the tubes 53 of the shift right gate circuits 50—52 are conditioned for operation by impressing a positive voltage on the grids 55 thereof through conductors 69—71. Thereafter clear line 39 is pulsed to interrupt the conductivity of the numbers receiving tubes 14 of the circuits 6 and 8. Such interruptions produce positive voltage impulses from the choke circuits 46 associated with circuits 6 and 8 and the impulses act on the second control grids 56 of the tubes 53 of the shift right gate circuits 50 and 52 to produce a conductive condition in the tubes 53 thereof and thereby lower the anode voltage of numbers receiver tubes 14 of the flip-flop circuits 3 and 5 to store the binary character 1 therein. Thus, the binary number in circuits 2—5 is now 0101, which is the binary number 1010 divided by 2.

Successive divisions by 2 may be accomplished in the same manner and the size of binary number which may be handled and the number of successive divisions possible is limited only by the number of flip-flop circuits in each plurality of flip-flop circuits. Multiplication is accomplished in the same manner by operating the shift left gate circuits and making the shift right gate circuits inoperative.

Therefore, in accordance with my invention I have provided a shifting register simple in structure and reliable in operation to store any given binary number of any number of digits and thereafter controllably shift such binary number successively in one digit displacement to the right or left of its original stored position as desired.

Such a register is useful in conjunction with a shifting binary adder and a static register suitably coupled thereto to form therewith a high speed binary calculator capable of multiplying or dividing any binary number by another binary number, in which case it will be understood that various control circuits may be energized in response to voltage pulses received from associated elements of a binary digital computer.

While I have shown and described a particular embodiment of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States, is:

1. A shifting register for binary numbers comprising a first plurality of flip-flop circuits, means for actuating each of said circuits to represent the character of a particular digit of a binary number thereby to store and clear said binary number in said circuits, said means comprising a plurality of clear actuating electronic circuits and a plurality of numbers actuating electronic circuits, one clear actuating circuit and one numbers actuating circuit being electrically connected to each of said flip-flop circuits, means for operating selected ones of said numbers actuating electronic circuits to store a particular binary number in said plurality of flip-flop circuits, means for simultaneously operating all of said clear actuating electronic circuits to clear said flip-flop circuits of said particular binary numbers stored therein, a second plurality of flip-flop circuits each associated with a particular one of said first plurality of flip-flop circuits, means responsive to the operation of said first plurality of flip-flop circuits in response to the operation of said clear actuating electronic circuits for transferring said binary number in corresponding digital order from said first plurality of flip-flop circuits to said second plurality of flip-flop circuits, and means for transferring said binary number from said second plurality of flip-flop circuits back to said first plurality of flip-flop circuits in one digit displacement with respect to the original storage of said number therein and for controlling the direction of displacement of said digits.

2. A shifting register for binary numbers comprising a first plurality of flip-flop circuits, means for actuating selectively each of said circuits to represent the character of a particular digit of a binary number thereby to store a particular binary number in said circuits, said means comprising a plurality of clear actuating electronic circuits and a plurality of numbers actuating electronic circuits, one clear actuating circuit and one numbers actuating circuit being electrically connected to each of said flip-flop circuits, a second plurality of flip-flop circuits each associated with a particular one of said first plurality of flip-flop circuits, means transferring said binary number from said first plurality of flip-flop circuits to said second plurality of flip-flop circuits in corresponding digital order, said means comprising a second plurality of clear actuating circuits each electrically connected to one of said second plurality of flip-flop circuits to clear the same, a plurality of choke circuits electrically connected one to each of said first plurality of flip-flop circuits for current flow therethrough in response to a particular actuation of said flip-flop circuit associated therewith and having thereacross control voltages of one polarity in response to a change in current flow therethrough in one direction and control voltages of opposite polarities in response to a change in current flow therethrough in the reverse direction, and a plurality of transfer electronic circuits electrically interconnecting each of said choke circuits with an associated one of said second plurality of flip-flop circuits and operating in response to said control voltages of one polarity of said choke circuits, and means transferring said binary number from said second plurality of flip-flop circuits back to said first plurality of flip-flop circuits in one digit displacement with respect to the original storage position of said number therein and for controlling the direction of displacement of said digits.

3. A shifting register for binary numbers comprising a first plurality of flip-flop circuits, means for actuating selectively each of said circuits to represent the character of a particular digit of a binary number thereby to store a particular binary number in said circuits, said means comprising a plurality of clear actuating electronic circuits and a plurality of numbers actuating electronic circuits, one clear circuit and one numbers circuit being electrically connected to each of said flip-flop circuits, a second plurality of flip-flop circuits each associated with a particular one of said first plurality of flip-flop circuits, means transferring said binary number from said first plurality of flip-flop circuits to said second plurality of flip-flop circuits in corresponding digital order, said means comprising a second plurality of clear actuating electronic circuits each electrically connected to one of said second plurality of flip-flop circuits to clear the same, a plurality of choke circuits electrically connected one to each of said first plurality of flip-flop circuits for current flow therethrough in response to a particular actuation of said flip-flop circuit associated therewith and having thereacross control voltages of one polarity in response to a change in current flow therethrough in one direction and control voltages of opposite polarities in response to a change in current flow therethrough in the reverse direction, and a plurality of transfer electronic circuits electrically interconnecting each of said choke circuits with an associated one of said second plurality of flip-flop circuits and operating in response to said control voltages of one polarity of said choke circuits, means transferring said binary number from said second plurality of flip-flop circuits back to said first plurality of flip-flop circuits in one digit displacement with respect to the original storage position of said number therein and for controlling the direction of displacement of said digits, said means comprising a second plurality of choke circuits electrically connected one to each of said second plurality of flip-flop circuits for current flow therethrough in response to a particular actuation of said flip-flop circuit associated therewith and having thereacross control voltages of one polarity in response to a change in current flow therethrough in one direction and control voltages of opposite polarities in response to a change in current flow therethrough in the reverse direction, and a plurality of shift right and shift left gate electronic circuits electrically connected between said second plurality of choke circuits and said plurality of numbers actuating circuits in a predetermined order and operating in response to said control voltages of one polarity of said second plurality of choke circuits and means cooperatively controlling the operation of said shift left and shift right gate circuits.

4. A shifting register for binary numbers comprising a first and a second plurality of flip-flop circuits, each of said circuits comprising a grid biased electronic clear actuated tube and a grid biased electronic numbers actuated tube, an anode in each of said tubes, and connections for connecting said tubes to an electric supply source each through an anode resistor and for electrically interconnecting said tubes to conduct current alternately in response to a predetermined variation in the anode voltages thereof, means varying the anode voltage of each of said clear actuated tubes of said first plurality of flip-flop circuits to produce conduction in said clear actuated tubes and thereby store a particular binary character in each of said first plurality of flip-flop circuits, said means comprising a first plurality of electronic clear actuating circuits, and a grid biased electronic tube in each of said clear actuating circuits, each of said tubes being electrically connected to the anode of an associated clear actuated tube of said first plurality of flip-flop circuits and to a point of lower voltage potential, and said grids of said clear tubes in said actuating circuits being electrically connected to a common source of electric impulse to control the operation of said clear actuating circuits, means varying the anode voltage of any of said numbers actuated tubes of said first plurality of flip-flop circuits to store a binary character different from said particular character in selected ones of said first plurality of flip-flop circuits thereby to represent in said first plurality of circuits any particular binary number, said means comprising a first plurality of grid biased electronic numbers actuating circuits electrically connected each to the anode plate of a different one of said numbers actuated tubes of said first plurality of flip-flop circuits and to a point of lower voltage potential, and a grid biased electronic tube in each of said numbers actuating circuits, said grids of said tubes being electrically connected each to an appropriate source of electrical impulse to control the operation of said numbers actuating circuits, means transferring a particular binary number stored in said first plurality of flip-flop circuits to said second plurality of flip-flop circuits in corresponding digit relationship, said means comprising a second plurality of electronic clear actuating circuits electrically connected one between the anode of each of said clear actuated tubes in said second plurality of flip-flop circuits and a point of lower voltage potential, a grid biased electronic tube in each of said second plurality of clear actuating circuits, said grids of said tubes in said second plurality of clear actuating circuits being electrically connected to a second common source of voltage impulse to control the operation of said second plurality of actuating circuits, a plurality of choke coils each electrically connected in series with a different one of said numbers actuated tubes of said first plurality of circuits, a plurality of electronic transfer circuits electrically connected one to the anode of each of said numbers actuated tubes in said second plurality of flip-flop circuits and to a point of lower voltage potential, and a grid biased electronic tube in each of said transfer circuits, said grids of said tubes in said plurality of transfer circuits being electrically connected each to a particular one of said choke coils to actuate said tubes of said transfer circuits to conductive condition, and means shifting said binary number back to said first plurality of flip-flop circuits in one digit displacement with respect to the original stored position of said number therein, said means comprising a second plurality of choke circuits each electrically connected in series with a different one of said numbers actuated tubes of said second plurality of flip-flop circuits, and a plurality of shift right and shift left gate electronic circuits electrically connected in a predetermined order to said numbers actuated tubes of said first plurality of flip-flop circuits, to said second plurality of choke circuits and to a plurality of selective voltage sources to control the direction of shift of said binary number in the transfer thereof from said second plurality of flip-flop circuits back to said first plurality of flip-flop circuits.

5. A shifting register for binary numbers comprising a first and a second plurality of flip-flop circuits, each of said circuits comprising a grid biased electronic clear actuated tube and a grid biased electronic numbers actuated tube, an anode in each of said tubes, and connections for connecting said tubes to a source of voltage each through an anode resistor and for electrically interconnecting said tubes to conduct current alternately in response to a predetermined variation in the anode voltages thereof, means varying the anode voltage of each of said clear actuated tubes of said first plurality of flip-flop circuits to produce conduction in said clear actuated tubes and thereby store a particular binary character in each of said first plurality of circuits, means varying the anode voltage of said numbers actuated tubes of said first plurality of circuits to store a binary character different from said particular character in selected ones of said first plurality of circuits thereby to store in said first plurality of circuits a particular binary number, means transferring said particular binary number stored in said first plurality of flip-flop circuits to said second plurality of flip-flop circuits in corresponding digit relationship, said means comprising a plurality of electronic clear actuating circuits electrically connected one between the anode of each of said clear actuated tubes in said second plurality of flip-flop circuits and a point of lower voltage potential, a grid biased electronic tube in each of said clear actuating circuits, said grids of said tubes in said plurality of clear actuating circuits being electrically connected to a common source of voltage impulse to control the operation of said plurality of actuating circuits, a plurality of choke coils each electrically connected in series with a different one of said numbers actuated tubes of said first plurality of flip-flop circuits, a plurality of electronic transfer circuits electrically connected one to the anode of each of said numbers actuated tubes in said second plurality of flip-flop circuits and to a point of lower voltage potential, and a grid biased electronic tube in each of said transfer circuits, said grids of said tubes of said plurality of transfer circuits being electrically connected each to a particular one of said choke coils to actuate said transfer tubes to conductive condition, and means shifting said binary number back to said first plurality of flip-flop circuits in one digit displacement with respect to the original stored position of said number therein, said means comprising a second plurality of choke circuits each electrically connected in series with a different one of said numbers actuated tubes of said second plurality of flip-flop circuits, and a plurality of shift right and shift left gate electronic circuits electrically connected in a predetermined order to said numbers actuated tubes of said first plurality of flip-flop circuits, to said second plurality of choke circuits and to a plurality of selective voltage sources to control the direction of shift of said binary number in the transfer thereof from said second plurality of flip-flop circuits back to said first plurality of flip-flop circuits.

6. A shifting register for binary numbers comprising a first and a second plurality of flip-flop circuits, each of said circuits comprising a grid biased electronic clear actuated tube and a grid biased electronic numbers actuated tube, an anode in each of said tubes, and connections for connecting said tubes to an electric supply source each through an anode resistor and for electrically interconnecting said tubes to conduct current alternately in response to a predetermined variation in the anode voltages thereof, means varying the anode voltage of each of said clear actuated tubes of said first plurality of flip-flop circuits to produce conduction in said clear actuated tubes and thereby store a particular binary character in each of said first plurality of circuits, means varying the anode voltage of any of said numbers actuated tubes of said first plurality of circuits to store a binary character different from said particular character in selected ones of said first plurality of flip-flop circuits thereby to represent in said first plurality of circuits any particular binary number, means transferring said particular binary number stored in said first plurality of flip-flop circuits to said second plurality of flip-flop circuits in corresponding digit relationship, said means comprising a plurality of electric impulse responsive actuating members electrically connected one to each of said clear actuated tubes of said second plurality of flip-flop circuits and to a common source of positive electric impulse, a plurality of impulse producing circuits each electrically connected in series with a different one of said numbers actuated tubes of said first plurality of flip-flop circuits, and a plurality of electric impulse responsive transfer actuating members, said numbers actuated tubes of said first plurality of flip-flop circuits being electrically connected to said numbers actuated tubes of said second plurality of flip-flop circuits in a predetermined order through said plurality of transfer actuating members, and said transfer actuating members being electrically connected to and operated by said impulse producing circuits, and means shifting said binary number back to said first plurality of flip-flop circuits in one digit displacement with respect to the original stored position of said number therein, said means comprising a second plurality of electric impulse producing circuits each electrically connected in series with a different one of said numbers actuated tubes of said second plurality of flip-flop circuits, and a plurality of shift right and shift left gate electronic circuits electrically connected in a predetermined order to said numbers actuated tubes of said first plurality of flip-flop circuits, to said second plurality of impulse producing circuits and to a plurality of selective voltage sources to control the direction of shift of said binary number in the transfer thereof from said second plurality of flip-flop circuits back to said first plurality of flip-flop circuits.

7. A shifting register for binary numbers comprising a first and a second set of electronic flip-flop circuits, each of said flip-flop circuits comprising a clear tube and a numbers tube provided each with an anode and connections for connecting said tubes to a source of voltage, each through an anode resistor, and for electrically interconnecting said tubes each to conduct current selectively in response to a decrease in its anode voltage, means for simultaneously decreasing the anode voltages of all of the clear tubes in said first set to make them conducting to represent a first binary character in each of the flip-flop circuits of said first set, means for reducing the anode voltage of all of the clear tubes in said second set simultaneously to make them conducting to represent said first binary character in each of the flip-flop circuits of said second set, means for reducing the anode voltage of selected numbers tubes in said first set to make each conducting to represent a second binary character in said first set, means responsive to the change in anode current in each numbers tube in said first set when it is made nonconducting for making a corresponding numbers tube in said second set conducting to represent a second binary character in said second set, transfer-back means responsive to changes in the anode current in each numbers tube in said second set when it is made nonconducting for making conducting the next adjacent left and right numbers tubes in said first set, and means for selectively disabling said transfer-back means to control the direction of shift during such transfer back to said first set.

8. A shifting register for binary numbers comprising a first and a second set of electronic flip-flop circuits, each of said flip-flop circuits comprising a clear actuated tube and a numbers actuated tube provided each with an anode and connections for connecting said tubes to a source of voltage, each through an anode resistor, and for electrically interconnecting said tubes each to conduct current selectively in response to a decrease in its anode voltage, means comprising a first plurality of clear actuating tubes electrically connected each to a particular one of said clear actuated tubes in said first set and connections for connecting said first plurality of clear actuating tubes to a common source of positive voltage pulse to simultaneously decrease the anode voltage of all of the clear tubes in said first set to make them conducting to represent one binary character in each of the flip-flop circuits of said first set, means comprising a second plurality of clear actuating tubes electrically connected each to a particular one of said clear actuated tubes in said second set and connections for connecting said second plurality of clear actuating tubes to a second common source of positive voltage pulse to reduce the anode voltage of all of the clear actuated tubes in said second set simultaneously to make them conducting to represent said one binary character in each of the flip-flop circuits of said second set, means comprising a first plurality of numbers actuating tubes electrically connected each to a particular one of said numbers actuated tubes in said first set and connections for connecting each of said numbers actuating tubes to a separate source of positive voltage pulse to reduce the anode voltage of selective numbers actuated tubes in said first set to make each conducting to represent a second binary character in said first set, means comprising a first plurality of voltage impulse producing means and a second plurality of numbers actuating tubes, one impulse producing means and one numbers actuating tube being electrically connected between each numbers actuated tube of said first set and a corresponding numbers actuated tube of said second set to make a corresponding numbers tube in said second set conducting to represent a second binary character in said second set in response to the change in anode current in each numbers tube in said first set when it is made nonconducting, transfer-back means comprising a second plurality of voltage impulse producing means electrically connected one to each of said numbers actuated tubes of said second set and a plurality of shift left and shift right gate means electrically connected in a predetermined order to said second plurality of impulse producing means and to said numbers actuated tubes of said first set to make conducting the next adjacent left and right numbers actuated tubes in said first set in response to changes in the anode current in each numbers actuated tube in said second set when it is made nonconducting, and means comprising connections for connecting said shift left and shift right gate means to separate suitable sources of selective voltage bias for selectively disabling said shift left and shift right gate means to control the direction of shift during transfer back to said first set.

9. A shifting register for binary numbers comprising a first plurality of flip-flop circuits, means for actuating each of said circuits to represent the character of a particular digit of a binary number thereby to store and clear said binary number in said circuits, said means comprising a plurality of clear actuating electronic circuits and a plurality of numbers actuating electronic circuits, one clear actuating circuit and one numbers actuating circuit being electrically connected to each of said flip-flop circuits, means for operating selected ones of said numbers actuating electronic circuits to store a particular binary number in said plurality of flip-flop circuits, means for simultaneously operating all of said clear actuating electronic circuits to clear said flip-flop circuits of said particular binary number stored therein, a second plurality of flip-flop circuits each associated with a particular one of said first plurality of flip-flop circuits, and means responsive to the operation of said first plurality of flip-flop circuits in response to the operation of said clear actuating electronic circuits for transferring said binary number from said first plurality of flip-flop circuits to said second plurality of flip-flop circuits.

ROBERT A. EDWARDS.

References Cited in the file of this patent

UNITED STATES PATENTS

| Number | Name | Date |
|---|---|---|
| 2,192,612 | Lang et al. | Mar. 5, 1940 |
| 2,386,481 | Lang et al. | Oct. 9, 1945 |
| 2,404,047 | Flory et al. | July 16, 1946 |
| 2,409,689 | Morton et al. | Oct. 22, 1946 |
| 2,435,840 | Morton | Feb. 10, 1948 |
| 2,435,841 | Morton et al. | Feb. 10, 1948 |
| 2,445,215 | Flory | July 13, 1948 |
| 2,604,262 | Phelps et al. | July 22, 1952 |

OTHER REFERENCES

Interim Progress Reports on the Physical Realization of an Electronic Computing Instrument, Bigelow et al., The Institute for Advanced Study, Princeton, N. J. Third Report, Jan. 1, 1948, pages 47–68. Fourth Report, July 1, 1948, pages III–1 to III–5.